(12) United States Patent
Kuzuya et al.

(10) Patent No.: US 7,178,809 B2
(45) Date of Patent: Feb. 20, 2007

(54) ROOF WEATHER STRIP FOR CONVERTIBLE CAR

(75) Inventors: Hiroshi Kuzuya, Aichi-ken (JP); Yoshihiro Kurosaki, Aichi-ken (JP); Toshiya Miyashita, Toyota (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 57 days.

(21) Appl. No.: 11/038,483

(22) Filed: Jan. 21, 2005

(65) Prior Publication Data

US 2005/0179217 A1   Aug. 18, 2005

(30) Foreign Application Priority Data

Jan. 23, 2004  (JP) ............... 2004-015337

(51) Int. Cl.
*B60J 10/02* (2006.01)
*B60J 7/00* (2006.01)
*E06B 7/16* (2006.01)

(52) U.S. Cl. .............. 277/631; 277/645; 277/921; 296/107.04; 296/146.14; 296/219; 296/222; 296/216.06; 49/498.1; 49/482.1

(58) Field of Classification Search ............ 277/645, 277/921, 631, 906; 49/498.1, 482.1; 296/220.01, 296/219, 222, 216.04, 216.06, 216.09, 107.04, 296/146.14
See application file for complete search history.

(56) References Cited

U.S. PATENT DOCUMENTS

| | | | | |
|---|---|---|---|---|
| 2,974,079 A | * | 3/1961 | Korotkevich | 277/631 |
| 3,206,246 A | * | 9/1965 | Williams | 296/219 |
| 4,508,355 A | * | 4/1985 | Ditcher | 277/605 |
| 4,769,947 A | * | 9/1988 | Ogawa et al. | 49/479.1 |
| 5,396,691 A | * | 3/1995 | Wiegand | 29/432.1 |
| 5,601,329 A | * | 2/1997 | Glagow et al. | 296/146.14 |
| 6,189,950 B1 | * | 2/2001 | Kawazoe et al. | 296/107.04 |
| 6,598,349 B1 | * | 7/2003 | Balbaugh et al. | 49/490.1 |
| 6,685,252 B2 | * | 2/2004 | Graf et al. | 296/108 |
| 6,802,666 B1 | * | 10/2004 | Bormann et al. | 403/233 |

FOREIGN PATENT DOCUMENTS

| | | |
|---|---|---|
| JP | U-H07-24614 | 5/1995 |
| JP | A-H11-129766 | 5/1999 |
| JP | 2005-206094 | * 8/2005 |

* cited by examiner

*Primary Examiner*—Alison K. Pickard
(74) *Attorney, Agent, or Firm*—Posz Law Group, PLC

(57) ABSTRACT

A roof weather strip for use in a convertible car is composed of a plurality of weather strip pieces corresponding to the folding of a sliding roof thereof. When the sliding roof is unfolded to form a roof of the convertible car, longitudinal end parts of adjacent roof weather strip pieces contact each other to define a continuously extending roof weather strip for sealing a side edge of the sliding roof. Each of the weather strip pieces has a base portion, a tubular door glass-sealing portion, and a sliding roof-sealing portion. In each of the longitudinal end parts, the sliding roof-sealing portion is formed tubular, and the tubular sliding roof-sealing portion and the tubular door glass-sealing portion are closed with end faces, respectively, which are provided in each of the longitudinal end parts.

5 Claims, 3 Drawing Sheets

ROOF WEATHER STRIP FOR CONVERTIBLE CAR

CROSS-REFERENCE TO RELATED APPLICATION

This application is related to and claims priority from Japanese patent application No. 2004-015337, incorporated herein by reference.

BACKGROUND OF THE INVENTION

1. Field of the Invention

The present invention relates to a roof weather strip for a convertible car having a sliding roof which can be folded and retracted inside a car body and, more particularly, to a roof weather strip which seals a gap between a side edge of the sliding roof and a fully closed door glass.

2. Description of Related Art

A convertible car has a sliding roof which can be folded and retracted inside a car body. When the sliding roof is unfolded and slid to close a roof opening of the convertible car, a gap between a side edge of the sliding roof and a fully closed door glass must be sealed. To this end, a roof weather strip is attached to a roof-side frame which is provided along the side edge of the sliding roof. Since the roof-side frame is foldable, similarly to the sliding roof, the roof weather strip is divided into weather strip pieces corresponding to the folding of the roof-side frame (see publication of Japanese Utility model application No. Hei 7-24614, FIG. 1, ex.).

FIG. 1 shows an appearance of a convertible car, and FIG. 2 illustrates one example of a conventional roof weather strip for a convertible car. As shown, a roof weather strip 10 has a door glass-sealing portion 12 for sealing a door glass 14, and a sliding roof-sealing portion 16 for sealing a sliding roof 18. The door glass-sealing portion 12 and the sliding roof-sealing portion 16 are formed separately from each other.

The door glass-sealing portion 12 has a tubular cross-section. A seal wall thereof contacts a peripheral edge of the door glass 14 to seal the same. A base part 23 of the door glass-sealing portion 12 is fitted in a retainer 20 mounted on a roof-side frame 22.

A base part 24 of the sliding roof-sealing portion 16 is secured to the roof-side frame 22, and a sliding roof-sealing lip 26 thereof contacts an inside face of a side edge of the sliding roof 18 to seal the same (see unexamined publication of Japanese Patent application No. Hei 11-129766, pages 3 to 4, and FIG. 1, ex.).

A roof top 28 of the sliding roof 18 is flexible so that a gap between the flexible roof top 28 and the roof-side frame 22 may vary, and accordingly, the seal between the side edge of the sliding roof 18 and the sliding roof-sealing lip 26 may become insufficient. To overcome this problem, and ensure the seal between the sliding roof 18 and the roof weather strip 10, it has been tried to form a double seal by providing two parallel sliding roof-sealing lips 26.

The roof weather strip 10 is composed of a plurality of weather strip pieces corresponding to the folding of the roof top 28 and roof-side frame 22. When the sliding roof 18 is unfolded to cover a roof opening of the vehicle body, facing end faces of adjacent weather strip pieces contact each other to define a continuously extending roof weather strip 10 for sealing the side edge of the sliding roof 18. To ensure the seal between the facing end faces of the adjacent weather strip pieces, they must closely contact each other without creating any gap therebetween.

The sliding roof-sealing lip 26 has a plate-shaped configuration with a tapered cross-section of which a tip end is thin, and is composed of rubber, thermoplastic elastomer, or the like, each exhibiting flexibility. Accordingly, it is difficult to bring facing end faces of the sliding roof-sealing lips 26 of adjacent weather strip pieces into close contact with each other. Where the facing end faces of the sliding roof-sealing lips 26 do not closely contact each other, but offset from each other, a desired good seal may not be effected therebetween.

SUMMARY OF THE INVENTION

Accordingly, it is an object of the present invention to provide a roof weather strip for use in a convertible car, which is divided into weather strip pieces, each having a sliding roof-sealing lip, wherein when a sliding roof is unfolded and slid to form a roof of the convertible car, facing end faces of adjacent weather strip pieces, inclusive of facing end faces of the sliding roof-sealing lip thereof, contact each other, thereby effecting a good seal between the sliding roof and a door glass in its fully closed position.

The roof weather strip in accordance with the present invention is composed of a plurality of weather strip pieces corresponding to the folding of the sliding roof, which are secured to a roof-side frame for the sliding roof. When the sliding roof is unfolded to form a roof of a car body, facing longitudinal end parts of adjacent weather strip pieces contact each other to form a continuously extending roof weather strip for sealing a side edge of the sliding roof. Each of the weather strip pieces has a base portion for attachment to a retainer which is secured to the roof-side frame, a door glass-sealing portion which is integrally formed with the base portion for contacting a peripheral edge of a door glass, and a sliding roof-sealing portion which is formed along the door glass-sealing portion integrally therewith for contacting the side edge of the sliding roof. In each of longitudinal end parts of each weather strip piece, the sliding roof-sealing portion has a tubular configuration, and the tubular sliding roof-sealing portion and a tubular part of the door glass-sealing portion are respectively closed with end faces in each longitudinal end part of each weather strip piece.

Since the roof weather strip in accordance with the present invention is composed of a plurality of weather strip pieces corresponding to the folding of the sliding roof, which are secured to roof-side frames for the sliding roof, when the sliding roof is unfolded to form a roof of a car body, facing longitudinal end parts of the weather strip pieces contact each other to form a continuously extending roof weather strip for sealing the side edge of the sliding roof, and when the sliding roof and the roof-side frame are folded and retracted inside the car body, the roof weather strip can be also retracted inside the car body along with the sliding roof and the roof-side frame. And when the sliding roof is unfolded to form a roof of the car body, the side edge of the sliding roof can be sealed with the continuously extending roof weather strip.

Since the weather strip piece has a base portion for attachment to a retainer which is secured to the roof-side frame, a door glass-sealing portion which is integrally formed with the base portion for contacting a peripheral edge of the door glass, and a sliding roof-sealing portion which is formed along the door glass-sealing portion integrally therewith for contacting an inside face of a side edge of the sliding roof, by attaching the base portion to the retainer, the door glass-sealing portion and the sliding roof-sealing portion of each weather strip piece can be attached to the car body at the same time, thereby improving the attaching efficiency of the roof weather strip. In addition, the sliding roof-sealing portion can be integrally formed with the door glass-sealing portion at the same time by extrusion, thereby facilitating the production of the roof weather strip.

Since when the sliding roof is unfolded to form a roof of the car body, a projecting end of the sliding roof-sealing portion of each weather strip piece contacts and seals the inside face of the side edge of the sliding roof, a gap between the sliding roof and the roof weather strip can be securely sealed. And since when the door glass is raised to its fully closed position, the door glass-sealing portion of each weather strip piece seals a gap between the door glass and the roof weather strip, a gap between the sliding roof and the door glass can be sealed with the sliding roof-sealing portion and the door glass-sealing portion.

Since in each of the longitudinal end parts of each weather strip piece, the sliding roof-sealing portion is formed to have a tubular configuration, when facing longitudinal end parts of the weather strip pieces contact each other to form a continuously extending roof weather strip, the rigidity of each longitudinal end part is enhanced, and the facing longitudinal end parts can be prevented from greatly deforming, and can readily contact each other. And if the facing longitudinal end parts do not properly meet each other upon contacting, they are prevented from coming off from each other and good sealing properties can be achieved, because the tubular sliding roof-sealing portion has a greater sectional area.

Since the tubular sliding roof-sealing portion and the tubular part of the door glass-sealing portion are respectively closed with end faces provided in each of the longitudinal end parts of each weather strip piece, the rigidity of the end faces of the longitudinal end parts of each weather strip piece can be enhanced, whereby when the facing longitudinal end parts of adjacent weather strip pieces contact each other, the configuration thereof can be prevented from greatly deforming, and good stability thereof can be obtained. In addition, rainwater, dust, noise or the like can be prevented from intruding into an interior of the car body via gaps between the facing longitudinal end parts of the adjacent weather strip pieces.

In accordance with the present invention, it is preferable that in a central part of each weather strip piece, the sliding roof-sealing portion is composed of a tubular base which is formed integrally with the door glass-sealing portion, and two sliding roof-sealing lips for contacting the sliding roof, which project from the tubular base in a vertically parallel relation. The central part thus arranged can be readily formed by extrusion, and the two sliding roof-sealing lips can be provided so as to project from the tubular base towards an inside face of the side edge of the sliding roof. Thus, in the central part of each weather strip piece, a double sealing can be effected against the sliding roof by virtue of the two sliding roof-sealing lips, whereby a secure seal can be effected between the sliding roof and the central part.

And it is preferable that in each longitudinal end part of each weather strip piece, the two sliding roof-sealing lips are connected to each other at projecting ends thereof to define a tubular sliding roof-sealing portion. Consequently, the rigidity of each longitudinal end part is enhanced, and when facing longitudinal end parts contact each other, they do not deform, and a continuous seal without generating any gap between contacting longitudinal end parts can be obtained. In addition, the double sealing in the central part gradually varies to a single sealing in the longitudinal end parts, and accordingly, any interruption of seal lines does not occur.

It is preferable that the central part of each weather strip piece is formed by extrusion, and the longitudinal end part of each weather strip piece is formed by molding. With this arrangement, as compared with the case where each weather strip piece is entirely formed by molding, a molding die can be made small, and the construction of the molding die can be made simple. Consequently, production costs of the molding die can be reduced, and the molding rate can be increased, thereby reducing the entire production costs of the roof weather strip.

It is preferable that in the longitudinal end part of each weather strip piece, the sliding roof-sealing lips and the tubular base of the sliding roof-sealing portion define a tubular cross-section with a generally elliptic shape. With this arrangement, in the longitudinal end part of each weather strip piece, a projecting outside face of the tubular sliding roof-sealing portion with an elliptic cross-section contacts and seals an inside face of the side edge of the sliding roof. By virtue of the tubular sliding roof-sealing portion thus arranged, the sliding roof-sealing lips provided in the central part is prevented from readily deforming, and only a single core is needed in a molding die for molding the tubular sliding roof-sealing portion, and accordingly the production of the roof weather strip is facilitated.

It is preferable that the door glass-sealing portion is composed of a tubular sealing portion.

With this arrangement, when the door glass is raised, a peripheral edge of the door glass contacts the tubular sealing portion, thereby effecting a seal therebetween. If the peripheral edge of the door glass vibrates when the car body vibrates, or when the door glass is drawn outwardly during running of a car, the tubular sealing portion which exhibits elasticity and has a considerable width can absorb the vibrations of the peripheral edge of the door glass, and consequently, the peripheral edge of the door glass can continuously contact the tubular sealing portion.

It is preferable that in the central part of the weather strip piece, the tubular base of the sliding roof-sealing portion is formed to have a generally lozenge-shaped cross-section so as to accommodate variations in the thickness of the sliding roof, and in the longitudinal end part of the weather strip piece, an outside wall of the tubular base protrudes outwardly to connect the projecting ends of the two sliding roof-sealing lips each other. With this arrangement, where the thickness of the sliding roof varies, the lozenge-shaped sliding roof-sealing portion deforms to accommodate the variations therein, thereby ensuring good sealing properties.

And, in the longitudinal end part of the weather strip piece, the tubular sliding roof-sealing portion can be readily formed. The two sliding roof-sealing lips in the central part can be gradually and smoothly varied to the tubular sliding roof-sealing portion in the longitudinal end part.

In accordance with the present invention, in each longitudinal end part of each of the weather strip pieces composing the roof weather strip for the sliding roof of a convertible car, the sliding roof-sealing portion is formed tubular. Accordingly, when the sliding roof is unfolded to form a roof of the convertible car, the sliding roof-sealing portion in each longitudinal end part exhibits high rigidity so that the deformation thereof is reduced. Accordingly, facing longitudinal end parts of adjacent weather strip pieces readily contact each other with good sealing properties.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, one embodiment of the roof weather strip in accordance with the present invention will be explained with reference to FIGS. 1, 3 through 6.

Figure 1:
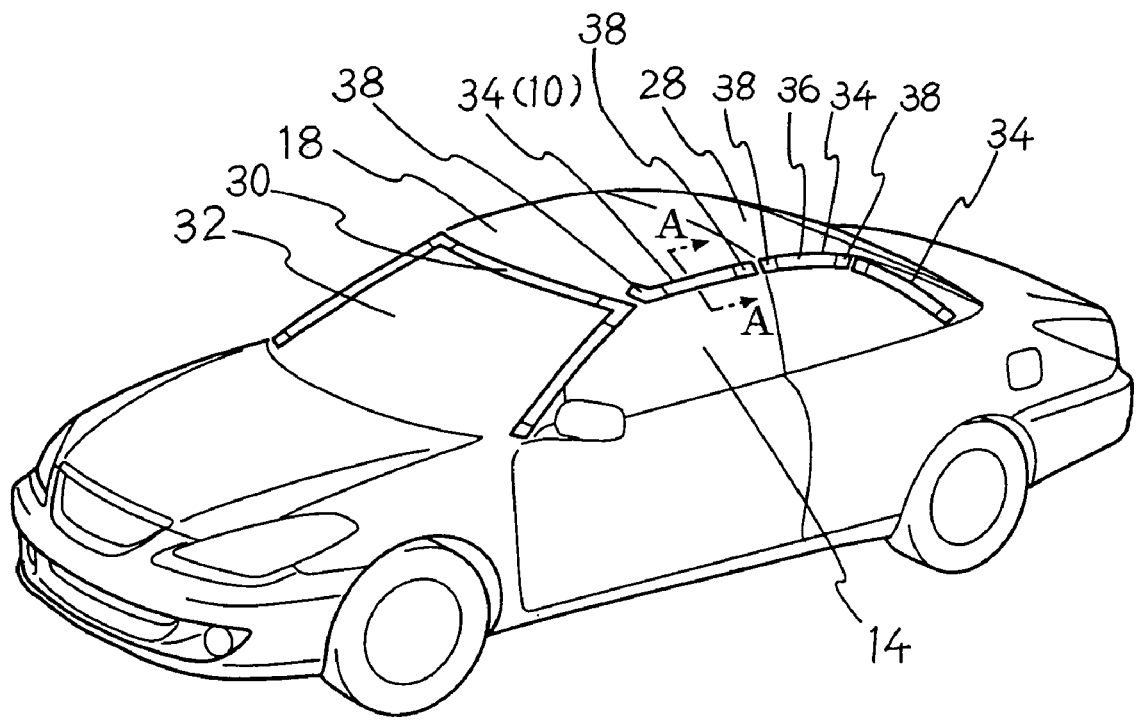
FIG. 1 is a perspective view showing an appearance of a convertible car.
Figure 2:
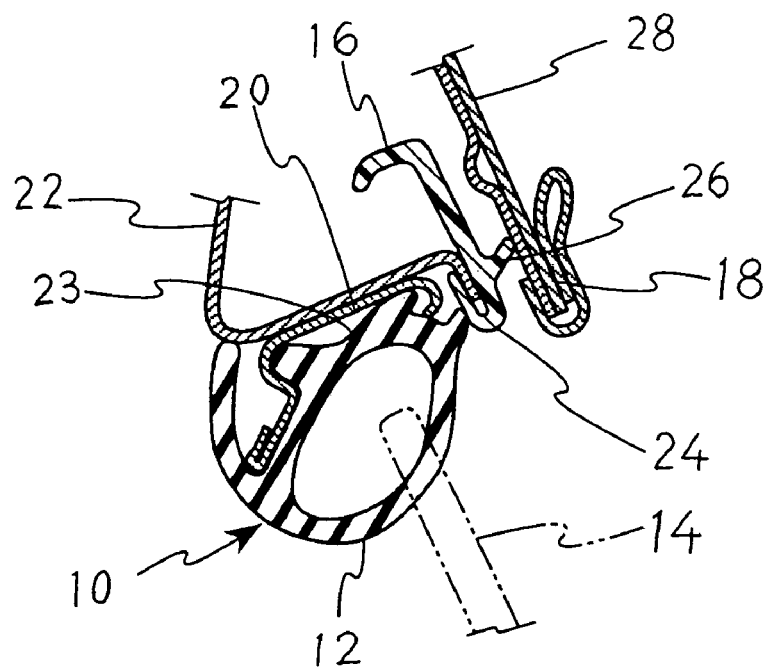
FIG. 2 is a partially cut-away cross-sectional view showing an attachment state of a conventional roof weather strip, which is taken along line A—A of FIG. 1.

FIG. 1 is a perspective view showing an appearance of a convertible car. When a sliding roof 18 is unfolded, it covers a roof opening of the convertible car, and a front edge of the sliding roof 18 contacts a front glass roof weather strip 30 provided along an upper edge of a front glass 32. The front glass roof weather strip 30 extends downwardly along front pillars to cover both side edges of the front glass 32.

A roof weather strip 34 is provided along each of side edges of the sliding roof 18 to seal gaps between the sliding roof 18 and the door glass 14. The roof weather strip 34 is longitudinally divided into a plurality of weather strip pieces, each being provided corresponding to the folding of the sliding roof 18.

The sliding roof 18 has flexible and foldable roof tops 28, and roof-side frames 22 (FIG. 4) which extend along both side edges of the roof tops 28.

Figure 3:
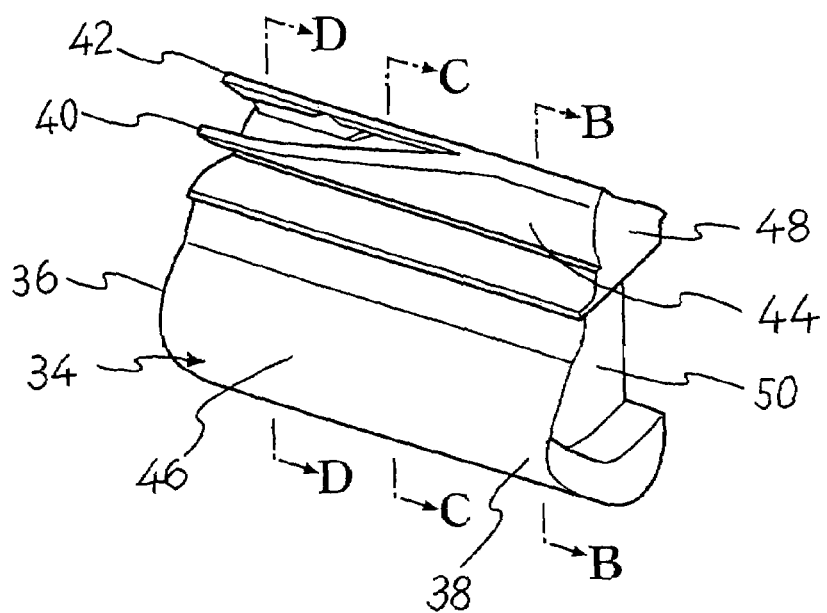
FIG. 3 is a partially perspective view of one embodiment of a roof weather strip in accordance with the present invention, which shows one longitudinal end part thereof.

As shown in FIG. 3, each weather strip piece of the roof weather strip 34 has a central part 36 which is formed by extrusion, and longitudinal end parts 38 which are formed on both longitudinal sides of the central part 36 by molding. The weather strip piece thus constructed is attached to the roof-side frame 22.

When the sliding roof 18 is unfolded to form a roof of the convertible car, the longitudinal end parts 38 of adjacent weather strip pieces contact each other to form a continuously extending roof weather strip 34.

To retract the sliding roof 18, the roof tops 28 are folded and moved rearwards by means of a link mechanism (not shown) and a driving mechanism (not shown), and then retracted in a space provided in a rear part of a car body. At the same time, the roof-side frames 22 are also folded and retracted along with the roof tops 28. When the roof-side frames 22 are folded, the weather strip pieces of the roof weather strip 34 are also folded, and retracted along with the roof-side frames 22.

When the sliding roof 18 is unfolded to form a roof of the convertible car, the roof-side frames 22 extend to upper corners of the front glass 32, and the roof tops 28 also extend to the upper edge of the front glass 32.

Figure 4:
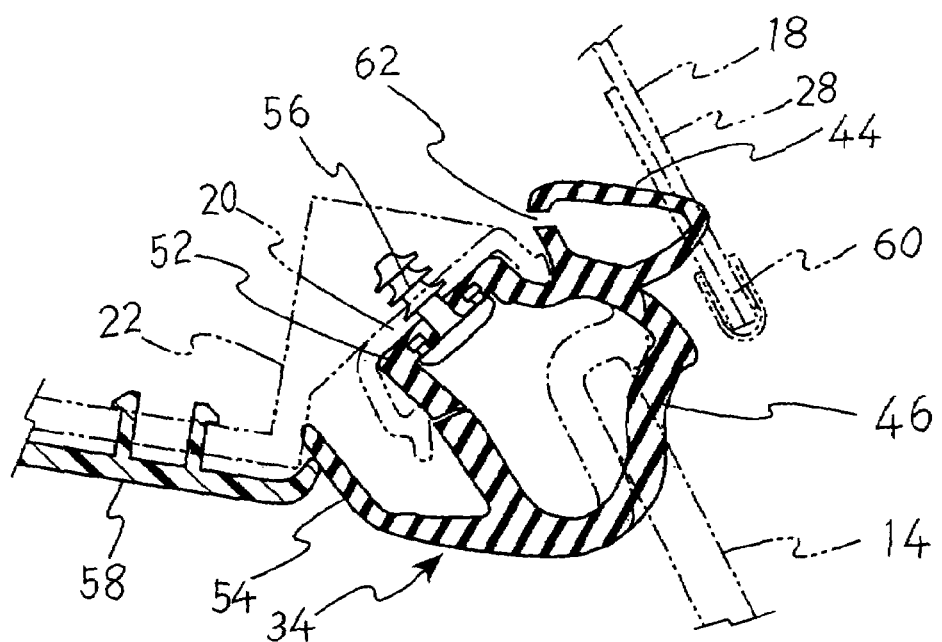
FIG. 4 is a partially cut-away cross-sectional view of one embodiment of the roof weather strip in accordance with the present invention, which is taken along line B—B of FIG. 3.
Figure 5:
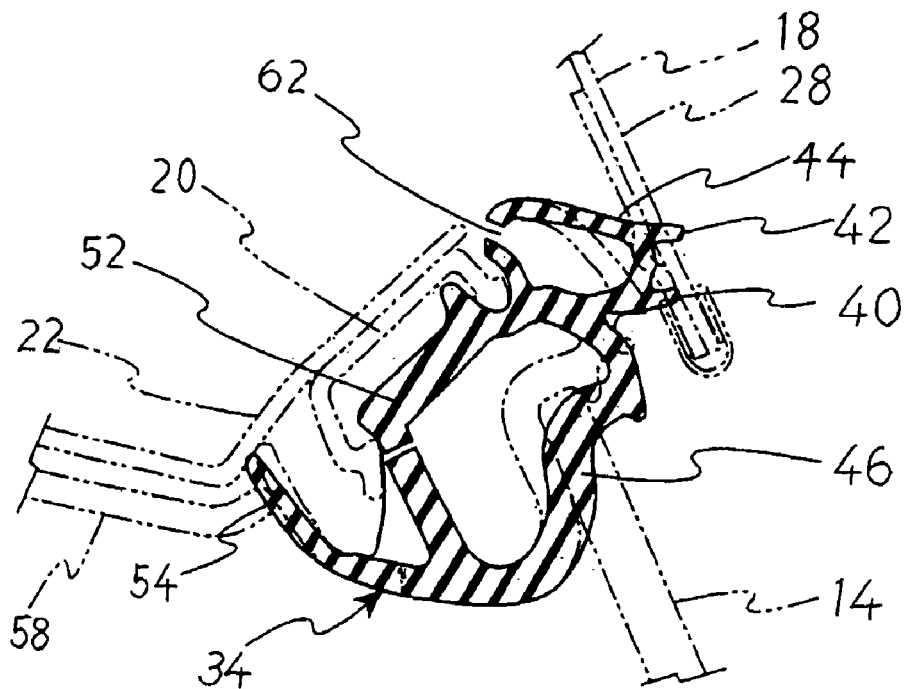
FIG. 5 is a partially cut-away cross-sectional view of one embodiment of the roof weather strip in accordance with the present invention, which is taken along line C—C of FIG. 3.
Figure 6:
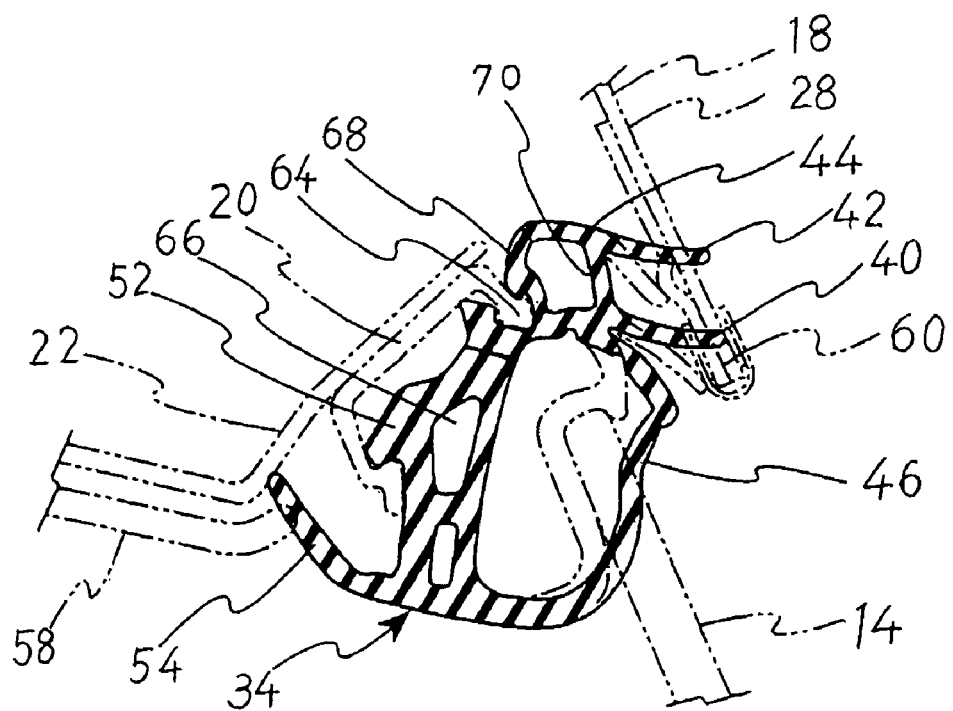
FIG. 6 is a partially cut-away cross-sectional view of one embodiment of the roof weather strip in accordance with the present invention, which is taken along line D—D of FIG. 3.

Hereinafter, the roof weather strip 34 will be explained in detail. FIG. 3 is a partially cut-away perspective view of the longitudinal end part 38 of one weather strip piece composing the roof weather strip 34. FIGS. 4, 5 and 6 are partially cut-away cross-sectional views taken along line B—B, C—C and D—D of FIG. 3, respectively.

As shown in FIG. 3, the longitudinal end part 38 is formed by molding on each longitudinal side of the central part 36 integrally therewith. A first sliding roof-sealing lip 40 and a second sliding roof-sealing lip 42 are provided in the central part 36 in a generally vertically parallel relation. And in the longitudinal end part 38, the first sliding roof-sealing lip 40 gradually approaches and joins the second sliding roof-sealing lip 42 to define a tubular sliding roof-sealing portion 44.

The tubular sliding roof-sealing portion 44 and a tubular door glass-sealing portion 46 are closed with films in the longitudinal end part 38 to define end faces 48 and 50. Consequently, when the longitudinal end parts 38 of adjacent weather strip pieces contact each other, a great contacting area is ensured with the end faces 48 and 50 so that rainwater, dust, and noise can be prevented from intruding into an interior of the car body from a gap between the facing longitudinal end parts 38.

In addition, by providing concaves and convexes in the end faces 48 and 50 so as to fit each other when the sliding roof 18 is unfolded, a secure joint is effected between adjacent weather strip pieces of the roof weather strip 34.

Hereinafter, the configuration and attaching state of the longitudinal end part 38 of the weather strip piece of the roof weather strip 34 along with the sealing state against the door glass 14 and the sliding roof 18 will be explained with reference to FIG. 4.

The weather strip piece of the roof weather strip 34 has a base portion 52, a sliding roof-sealing portion 44, a door glass-sealing portion 46 and a cover lip 54. In the longitudinal end part 38, clips 56 are mounted on the base portion 52. By inserting a leg of each clip 56 in a clip hole provided in the roof-side frame 22, the longitudinal end part 38 is secured.

The door glass-sealing portion 46 is integrally formed with the base portion 52 and projects from both sides of the base portion 52 to define a space therewith. When the door glass 14 is raised to its fully closed position, a peripheral edge of the door glass 14 contacts the door glass-sealing portion 46 and is wrapped therewith, thereby sealing around the peripheral edge of the door glass 14. Consequently, rainwater, dust, etc. can be prevented from intruding into a vehicle compartment via a gap between the door glass 14 and the door glass-sealing portion 46.

The cover lip 54 is integrally formed with the door glass-sealing portion 46 so as to project inwardly from an inside wall of the door glass-sealing portion 46. The cover lip 54 and a sliding roof garnish 58 which is secured to the roof-side frame 22 cover the roof-side frame 22, thereby improving the appearance therearound.

The sliding roof-sealing portion 44 is integrally formed with the door glass-sealing portion 46 so as to project outwardly from an outside wall of the door glass-sealing portion 46, which faces the sliding roof 18. The sliding roof-sealing portion 44 defines a single space with a generally elliptic cross-section therein. When the sliding roof-sealing portion 44 contacts an inside face of a side edge 60 of the sliding roof 18, a gap between the sliding roof 18 and the roof weather strip 34 can be sealed. Since the sliding roof-sealing portion 44 also has a generally elliptic cross-section, a projecting edge of the sliding roof-sealing portion 44 can contact and seal the inside face of the side edge 60 of the sliding roof 18. By virtue of the elliptic cross-section, the sliding roof-sealing portion 44 is not readily deformed, and to mold the sliding roof-sealing portion 44, a plurality of cores are not needed, whereby the longitudinal end part 38 can be readily produced. A slit 62 is provided in the sliding roof-sealing portion 44 for removing a core therefrom after molding.

Thus, the longitudinal end part 38 can seal a gap between the sliding roof 18 and the door glass 14.

FIG. 5 is a cross-sectional view, taken in the position close to the central part 36 of the weather strip piece composing the roof weather strip 34. In this position, the cross-sectional shape of the sliding roof-sealing portion 44 gradually varies from that of the central part 36 to that of the longitudinal end part 38. More specifically, in this position, the cross-sectional shape remains generally elliptic, and the first sliding roof-sealing lip 40 and second sliding roof-sealing lip 42 project low. Consequently, the sealing state of the sliding roof-sealing portion 44 gradually varies from a double sealing with two sealing lips in the central part 36 to a single sealing with a tubular sealing portion in the longitudinal end part 38, whereby a secure seal is effected between the sliding roof 18 and the sliding roof-sealing portion 44 without producing a gap therebetween.

FIG. 6 is a cross-sectional view of the central part 36 of the weather strip piece composing the roof weather strip 34, which is formed by extrusion. The central part 36 has a base portion 52, a sliding roof-sealing portion 44, a door glass-sealing portion 46 and a cover lip 54. A groove 64 is formed in a bottom of the base portion 52. By fitting an outside wall of the retainer 20 which is secured to the roof-side frame 22 in the groove 64, the base portion 52 is attached to the roof-side frame 22. A bridge is provided across an interior of the door glass-sealing portion 46 along an inside wall thereof, thereby define a space 66. With this space 66, the inside wall of the door glass-sealing portion 46 is reinforced, and the weight thereof is reduced.

The cover lip 54 is integrally formed with the door glass-sealing portion 46 so as to project inwardly from the inside wall of the door glass-sealing portion 46. The cover lip 54 and the sliding roof garnish 58 which is secured to the roof-side frame 22 cover the roof-side frame 22, thereby improving the appearance therearound.

The door glass-sealing portion 46 is integrally formed with the base portion 52. When the door glass 14 is raised to its fully closed position, the peripheral edge of the door glass 14 contacts and is wrapped with the door glass-sealing portion 46, thereby sealing around the peripheral edge of the door glass 14.

The sliding roof-sealing portion 44 is integrally formed with the door glass-sealing portion 46 so as to project outwardly from an outside wall of the door glass-sealing portion 46, which faces the sliding roof 18. In the central part 36, the sliding roof-sealing portion 44 has a tubular base 68 defining a space with a generally lozenge-shaped cross-section. The first sliding roof-sealing lip 40 and the second sliding roof-sealing lip 42 project from the tubular base 68 towards the sliding roof 18. Projecting ends of the first sliding roof-sealing lip 40 and the second sliding roof-sealing lip 42 contact the inside face of the side edge 60 of the sliding roof 18 to effect a double sealing between the sliding roof 18 and the central part 36. Thus, the gap between the sliding roof 18 and the door glass 14 can be securely sealed. The tubular base 68 of the sliding roof-sealing portion 44 is formed hollow so as to be readily deformed when pushed by the sliding roof 18. Therefore, the variations in the thickness of the roof top 28 can be accommodated with the deformation of the tubular base 68 of the sliding roof-sealing portion 44.

In the present embodiment, in the longitudinal end part 38, a single sealing is provided in such a manner as to join projecting ends of the two sliding roof-sealing lips 40 and 42 each other. Alternatively, the single sealing in the longitudinal end part 38 may be provided in such a manner as to gradually protrude an outside wall 70 (FIG. 6) of the tubular base 68 in the central part 36 outwardly to connect the projecting ends of the two sliding roof-sealing lips 40 and 42 each other.

The central part 36 which is formed by extrusion and the longitudinal end part 38 which is formed by molding can be composed of rubber, thermoplastic elastomer, soft synthetic resin or the like. And EPDM rubber is preferable as the rubber, and thermoplastic olefine elastomer is preferable as the thermoplastic elastomer, considering the weather resistance, recycling properties, production cost, or the like.

The central part 36 and the longitudinal end part 38 may be composed of a solid material or a sponge material, but it is preferable to compose at least the sliding roof-sealing portion 44 and the door glass-sealing portion 46 of a sponge material, considering the flexibility and elasticity thereof.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A roof weather strip for providing a seal between a side edge of a sliding roof, which can be folded and retracted inside a car body, and a door glass, which is raised to a fully closed position thereof, the roof weather strip comprising a plurality of weather strip pieces, which are provided corresponding to the folding of the sliding roof and secured to a roof-side frame for the sliding roof, each of said plurality of weather strip pieces having a central part and longitudinal end parts provided on both longitudinal sides of said central part, said longitudinal end parts of adjacent weather strip pieces contacting each other to form a continuously extending roof weather strip for sealing the side edge of the sliding roof when the sliding roof is unfolded to form a roof of the car body, each of said central part and said longitudinal end parts of each weather strip piece including a base portion for attachment to a retainer which is secured to said roof-side frame, a door glass-sealing portion integrally formed with said base portion for contacting a peripheral edge of the door glass, and a sliding roof-sealing portion integrally formed with said door glass-sealing portion for contacting the side edge of the sliding roof, said sliding roof-sealing portion of each of said longitudinal end parts having a tubular configuration, and said tubular sliding roof-sealing portion and a tubular part of said door glass-sealing portion being closed with end faces, respectively, which are provided in each of said longitudinal end parts, wherein in said central part of each weather strip piece, said sliding roof-sealing portion is composed of a base, which is tubular and formed integrally with said door glass-sealing portion, and two sliding roof-sealing lips for contacting the sliding roof, wherein the two sliding roof-sealing lips project from said tubular base in a vertically parallel relation, and in each of said longitudinal end parts of each weather strip piece, said two sliding roof-sealing lips are connected to each other at projecting ends thereof.

2. A roof weather strip as claimed in claim 1, wherein said central part of each weather strip piece is formed by extrusion, and each of said longitudinal end parts of each weather strip piece is formed by molding.

3. A roof weather strip as claimed in claim 1, wherein in each of said longitudinal end parts of each weather strip piece, said two sliding roof-sealing lips and said tubular base of said sliding roof-sealing portion define a tubular cross-section with a generally elliptic shape.

4. A roof weather strip as claimed in claim 1, wherein said door glass-sealing portion is composed of a tubular sealing portion.

5. A roof weather strip as claimed in claim 1, wherein in said central part of each weather strip piece, said tubular base of said sliding roof-sealing portion is formed to have a generally lozenge-shaped cross-section so as to accommodate variations in the thickness of the sliding roof, and in each of said longitudinal end parts of each weather strip piece, an outside wall of said tubular base protrudes outwardly to connect said projecting ends of said two sliding roof-sealing lips to each other.

* * * * *